United States Patent [19]
Kiyono

[11] Patent Number: 4,834,426
[45] Date of Patent: May 30, 1989

[54] GUIDE RAIL LIP FOR PASSIVE SEAT BELT SYSTEM

[75] Inventor: Shunichi Kiyono, Fujisawa, Japan

[73] Assignee: Nippon Seiko Kabushiki Kaisha Corp., Tokyo, Japan

[21] Appl. No.: 166,027

[22] Filed: Mar. 9, 1988

[30] Foreign Application Priority Data

Mar. 9, 1987 [JP] Japan .............................. 62-33226[U]

[51] Int. Cl.$^4$ ............................................. B60R 21/00
[52] U.S. Cl. ..................................................... 280/804
[58] Field of Search ......................................... 280/804

[56] References Cited

U.S. PATENT DOCUMENTS

| 4,635,964 | 1/1987 | Ryu ....................................... | 280/804 |
| 4,659,107 | 4/1987 | Yokote ................................. | 280/804 |
| 4,671,537 | 6/1987 | Yoshitsugu ........................... | 280/804 |

FOREIGN PATENT DOCUMENTS 172049 11/1984 Japan .

Primary Examiner—Kenneth R. Rice
Attorney, Agent, or Firm—Wegner & Bretschneider

[57] ABSTRACT

Disclosed herein is a lip suitable for use with a guide rail of a passive seat belt system in which a webbing is displaceable between an occupant-releasing position and an occupant-restraining position while being guided by a member movable along the guide rail. The lip is equipped integrally with at least one elastic clip for fixing the lip on the guide rail. Also disclosed is a combination of lips for such a guide rail. The lips are equipped integrally with at least one elastic clip extending between the lips, whereby the lips are fixed on the guide rail by the clip.

19 Claims, 4 Drawing Sheets

FIG. 4
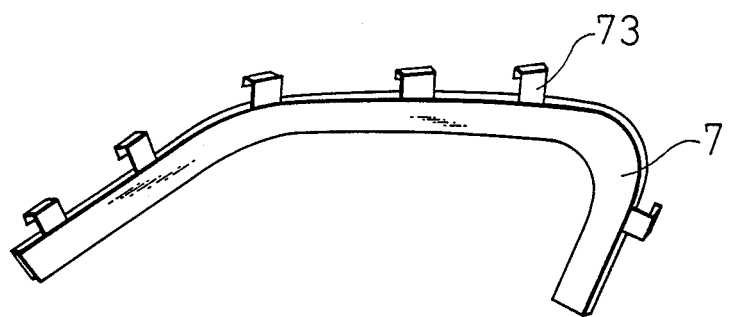
FIG. 5
FIG. 7
(PRIOR ART)
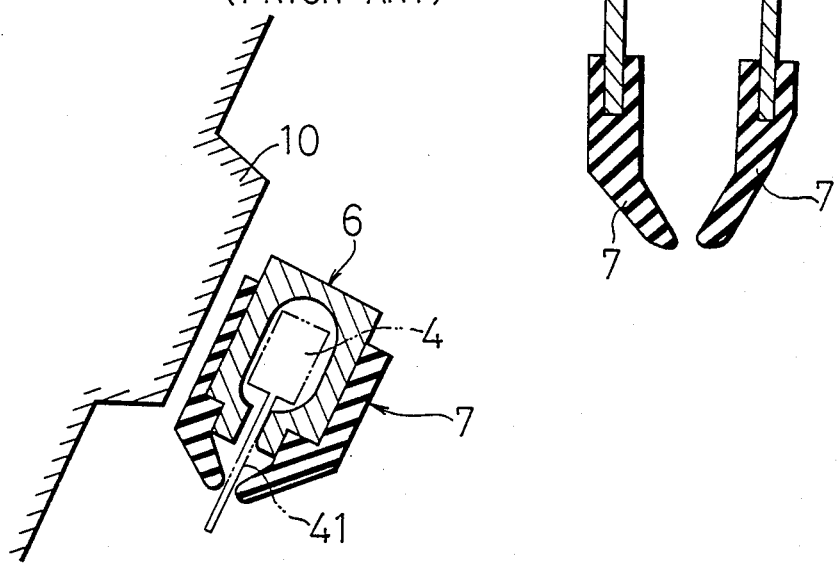

GUIDE RAIL LIP FOR PASSIVE SEAT BELT SYSTEM

BACKGROUND OF THE INVENTION (1) Field of the Invention

This invention relates to a guide rail lip for a passive seat belt system, and specifically to a guide rail lip equipped with clips as unitary members.

(2) Description of the Related Art

The use of a seat belt system has become popular in recent years, mainly, due to the mandatory requirement for the use of a seat belt system in an automotive vehicle such as automobile. Reflecting this move, there is an ever-increasing interest in passive seat belt systems which do not require much labor in fastening or releasing a webbing. This invention relates to a guide rail lip for a passive seat belt system. In order to facilitate the understanding of the present invention, the concept of a general passive seat belt system is described first of all with reference to FIG. 6. Numeral 1 indicates a webbing which is paid out from or taken up in a retractor 2 fixed on a seat 20. Designated at numeral 3 is an emergency release buckle (hereinafter referred to simply as "buckle"), in which a tongue attached to one end of the webbing 1 is inserted. Designated at numeral 4 is a movable anchor which is integral with the buckle 3. The movable anchor 4 travels, together with the buckle 3, through a guide rail 6 between an anchor base 5 arranged behind the seat 20 and the front end of the guide rail 6. In order to control the movement of the movable anchor 4, a front end switch 8 and an unillustrated rear end switch are provided at the front end of the guide rail 6 and within the anchor base 5 respectively. Designated at numeral 12 are brackets by which the guide rail 6 is mounted on a stationary base 10 of the vehicle. Numeral 91 indicates a drive member, such as wire, for driving the movable anchor 4, while numeral 9 designates a drive unit for taking up or pushing out the drive member 91. The operations of the drive member and drive unit are well known in the art and their detailed descriptions are omitted herein.

When the door is opened, the drive member 91 is pushed out from the drive unit 9 so that the movable anchor 4 is guided toward the front of the vehicle along the rail 6. As soon as the movable anchor 4 is brought into contact with the front end switch 8, the switch 8 stops the operation of the drive unit 9. Since the buckle 3 fixed integrally on the movable anchor 4 has also been brought to a front part of the stationary base, the webbing 1 has moved apart frontward from an occupant (not shown) so that the occupant is allowed to get off or get on the automobile easily.

When the occupant then gets on the automobile and closes the door, the drive unit 9 is actuated to take up the drive member 91, whereby the movable anchor 4 is then guided back to the anchor base 5 along the guide rail 6. Owing to the provision of the unillustrated rear end switch within the anchor base 5 as mentioned above, the operation of the drive unit 9 is stopped upon arrival of the movable anchor 4 at the anchor base 5. As a result, the webbing 1 restrains the body of the occupant as depicted in FIG. 6.

FIG. 7 is a cross-sectional view of the guide rail 6 taken in the direction of arrows VII—VII of FIG. 6. The guide rail 6 is mounted on the stationary base 10 of the vehicle by means of brackets 12. The movable anchor 4 is caused to move while being guided by the guide rail 6. Rubber-made lips 7,7 are attached to both sides of the guide rail 6 and are in contact with a stem 41 of the movable anchor 4. These lips 7,7 are provided to prevent the intrusion of foreign materials such as rail water and dust into the guide rail 6 and also to shield off the moving noise of the movable anchor 4.

FIGS. 8–10 illustrate a conventional lip structure and a method of its attachment. As shown in FIG. 8, longitudinal grooves 61,61 are formed centrally in both side walls of the guide rail 6 and matching longitudinal ridges 71,71 are formed at the corresponding parts of the lips 7,7. As depicted in FIG. 9, the ridges 71,71 of the lips 7,7 are fit in the corresponding grooves 61,61 of the guide rail 6 so that the lips 7,7 are attached to the guide rail 6. A clip 72 is additionally fit over the lips 7,7 to fix the lips 7,7 on the guide rail 6. FIG. 11 is a cross-sectional view taken in the direction of arrows XI—XI of FIG. 10. Instead of fitting together the guide rail and lips in the above manner, they may be put together by double-tack tapes and may then be fixed together by clips as depicted in FIGS. 10 and 11.

As has been described above, the structure and attachment method of such conventional lips do not permit easy assembly and requires rather many assembly steps, and may hence lead to an higher manufacturing cost.

SUMMARY OF THE INVENTION

With the foregoing in view, a principal object of this invention is to provide a lip which can be easily assembled with a guide rail of a passive seat belt system.

The present inventor has carried out an extensive investigation in order to attain the above object. As a result, it has been found that the use of elastic clips as integral or unitary members of a lip permits easy assembly of the lip on a guide rail.

In one aspect of this invention, there is thus provided a lip suitable for use with a guide rail of a passive seat belt system in which a webbing is displaceable between an occupant-releasing position and an occupant-restraining position while being guided by a member movable along the guide rail. The lip is equipped integrally with at least one elastic clip for fixing the lip on the guide rail.

In another aspect of this invention, there is also provided a combination of lips suitable for use with a guide rail of a passive seat belt system in which a webbing id displaceable between an occupant-releasing position and an occupant-restraining position while being guided by a member movable along the guide rail. The combined lips are equipped integrally with at least one elastic clip extending between the lips, whereby the lips are fixed on the guide rail by the clip.

Owing to the provision of the elastic clip as a integral or unitary member, the lip and combined lips can each be assembled easily with the guide rail. The assembly work has hence been facilitated and the number of assembling steps has been reduced.

BRIEF DESCRIPTION OF THE DRAWINGS

The above and other objects, features and advantages of the present invention will become apparent from the following description of the invention and the appended claims, taken in conjunction with the accompanying drawings, in which:

FIG. 4 depicts one of the lips of FIG. 1, which is provided with a plurality of clips;

FIG. 5 is a transverse cross-sectional view of a combination of lips, which relates to a second embodiment of this invention;

FIG. 7 is a cross-sectional view taken in the direction of arrows VII—VII of FIG. 6;

DETAILED DESCRIPTION OF THE INVENTION

Figure 1:
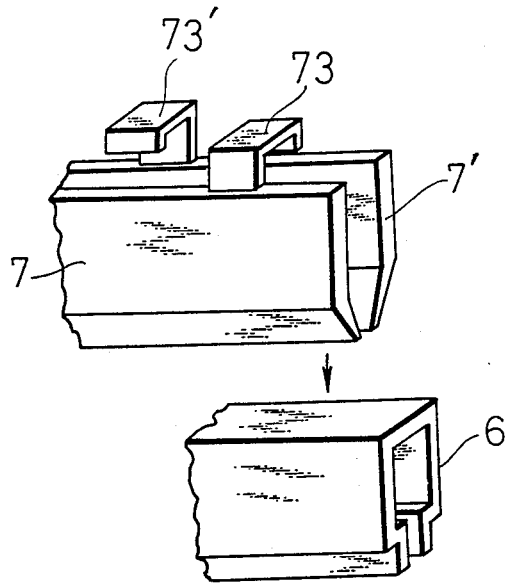
FIG. 1 illustrates lips according to a first embodiment of this invention together with a guide rail on which the lips are to be attached.
Figure 2:
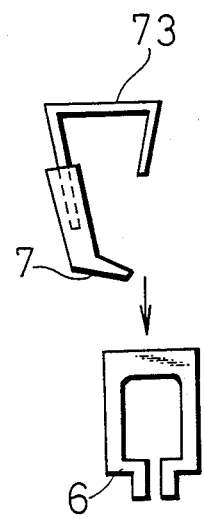
FIG. 2 shows how the lips of FIG. 1 are attached on the guide rail.
Figure 3:
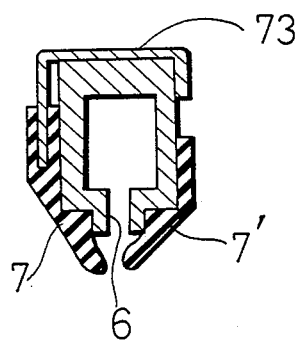
FIG. 3 is a cross-sectional view of one of the lips of FIG. 1 attached on the guide rail.
Figure 6:
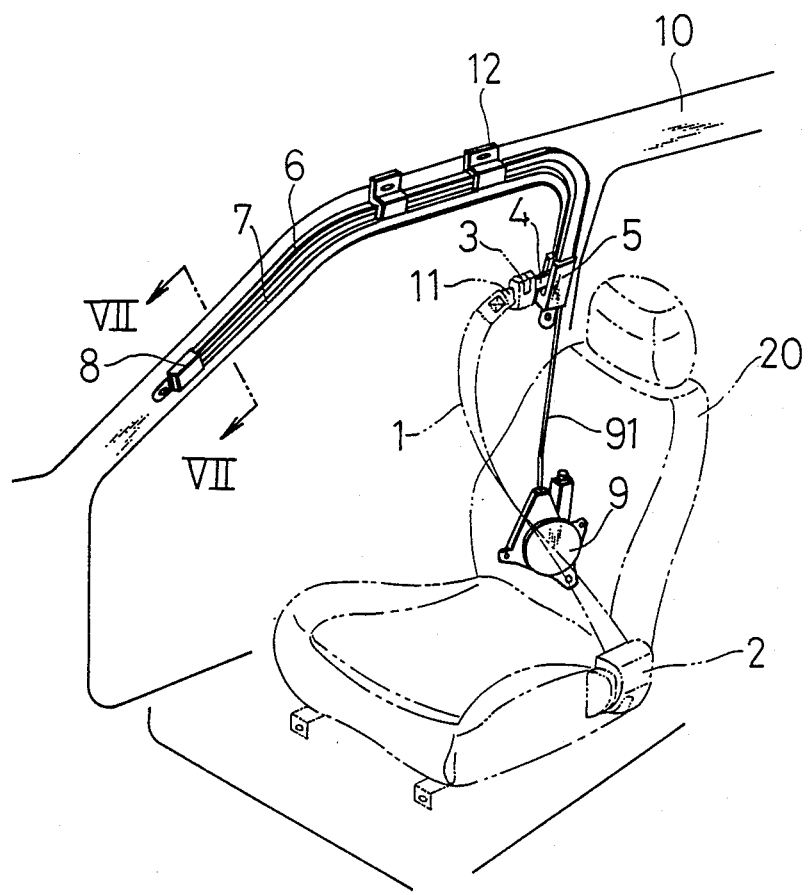
FIG. 6 is a schematic perspective view of a passive seat belt system.
Figure 8:
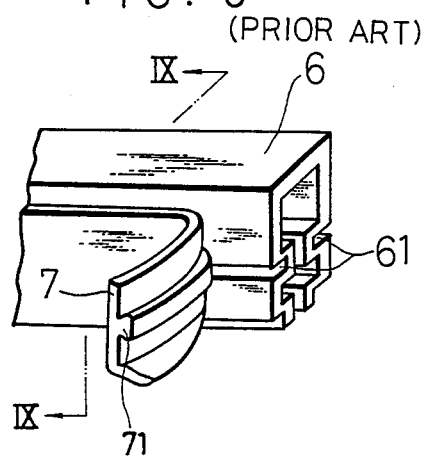
FIG. 8 shows the relationship between a conventional lip and a guide rail.
Figure 9:
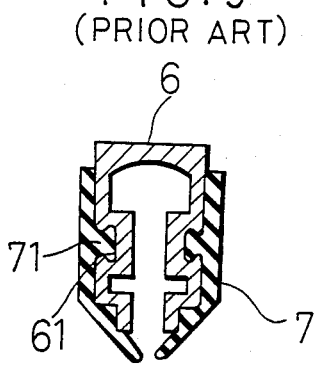
FIG. 9 is a transverse cross-sectional view showing the conventional lip of FIG. 8 fit on its corresponding guide rail.
Figure 10:
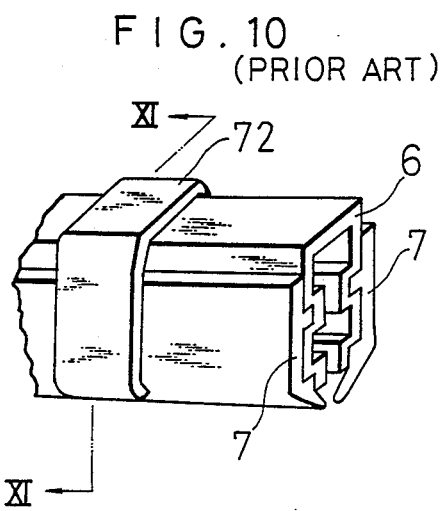
FIG. 10 illustrates the conventional lip of FIG. 8 fixed on its corresponding guide rail by a clip.
Figure 11:
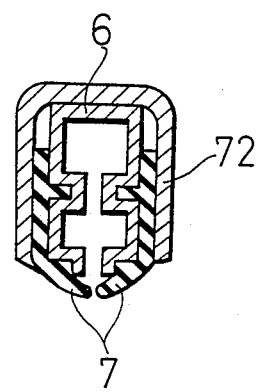
FIG. 11 is a transverse cross-sectional view taken in the direction of arrows XI—XI of FIG. 10.

The first embodiment of this invention is now described with reference to FIGS. 1 and 2. The lips 7,7' are provided respectively with clips 73,73', which are formed of elastic strips of spring steel or the like and are bent in an inverted L-shape so as to cover an upper part of the guide rail 6. The clips 73,73' were united with their corresponding lips 7,7' when the lips 7,7' were molded. FIG. 2 illustrates the manner of assembly of the clip-equipped lips with the rail. The clip-equipped lip corresponding to a front wall of the guide rail 6 is only shown in FIG. 2. The clip 73 is downwardly fit on an upper part of the guide rail 6. As illustrated in the cross-section of FIG. 3, the lip 7 is secured on the guide rail 6 by the clip 73 having elasticity. The lip 7' corresponds to the opposite side wall of the guide rail 6. The clip 73' of the lip 7' and the clip 73 of the lip 7 are fit on the guide rail 6 in such a way that their positions are offset. In FIG. 4, the lip 7 is equipped at suitable intervals with plural clips 73 provided as unitary members upon molding of the lip 7. The positions of the clips 73 are chosen so that the clips 73 and the clips of the opposite lip 7' are offset when the lips 7,7' are assembled with the guide rail 6.

The second embodiment is shown in FIG. 5. An elastic clip 74 having an inverted U shape and made of spring steel is provided integrally with lips 7,7 corresponding to both side walls of the guide rail 6. In the second embodiment, the lips 7,7 can be fixed on both side walls of the guide rail 6 by simply fitting the lips 7,7 along with their common clip 74 on the guide rail 6.

I claim:

1. A device for use with a guide rail of a passive seat belt system in which a webbing is displaceable between an occupant-releasing position and an occupant-restraining position while being guided by a member movable along the guide rail, comprising a lip extending along the guide rail and at least one elastic clip for fixing the lip on the guide rail, said at least one elastic clip being made of a different material then is said lip and being integrally attached to said lip.

2. The device as claimed in claim 1, wherein the guide rail has a transverse cross-section of substantially an inverted square U shape and the lip is provided on one of both side walls of the guide rail.

3. The device as claimed in claim 2, wherein the clip extends upwardly from an upper edge of the lip and then externally along a top wall of the guide rail, and engages the other side wall of the guide rail.

4. The device as claimed in claim 3, wherein the clip is formed of an elastic strip, and a free end portion thereof is bent toward the lip in a free state before attachment to the guide rail.

5. The device as claimed in claim 4, wherein the clip is formed of a strip of spring steel.

6. The device as claimed in claim 1, wherein a plurality of clips of the same type as said at least one clip are provided at intervals along the length of the guide rail.

7. The device as claimed in claim 1, wherein a portion of said at least one clip is embedded in the lip.

8. The device as claimed in claim 1, wherein said lip is made of an easily deformable material.

9. The device as claimed in claim 8, wherein said at least one clip is made of a rigid material.

10. The device as claimed in claim 9, wherein said easily deformable material is rubber and said rigid material is spring steel.

11. A device for use with a guide rail of a passive seat belt system in which a webbing is displaceable between an occupant-releasing position and an occupant-restraining position while being guided by a member movable along the guide rail, comprising a plurality of lips extending along the guide rail and at least one elastic clip extending between the lips, whereby the lips are fixed on the guide rail by the at least one clip, said at least one elastic clip being made of a different material than are said lips and being integrally attached to said lips.

12. The device as claimed in claim 11, wherein the guide rail has a transverse cross-section of substantially an inverted square U shape and the lips are provided on both side walls of the guide rail respectively.

13. The device as claimed in claim 12, wherein the clip connects both upper edges of the lips and is arranged outside an upper wall of the guide rail.

14. The device as claimed in claim 11, wherein the clip is formed of a strip of spring steel.

15. The device as claimed in claim 11, wherein a plurality of clips of the same type as said at least one clip are provided at intervals along the length of the guide rail.

16. The device as claimed in claim 11, wherein a portion of said at least one clip is embedded in the lips.

17. The device as claimed in claim 11, wherein said lips are made of an easily deformable material.

18. The device as claimed in claim 17, wherein said at least one clip is made of a rigid material.

19. The device as claimed in claim 18, wherein said easily deformable material is rubber and said rigid material is spring steel.

* * * * *